Figure 6:
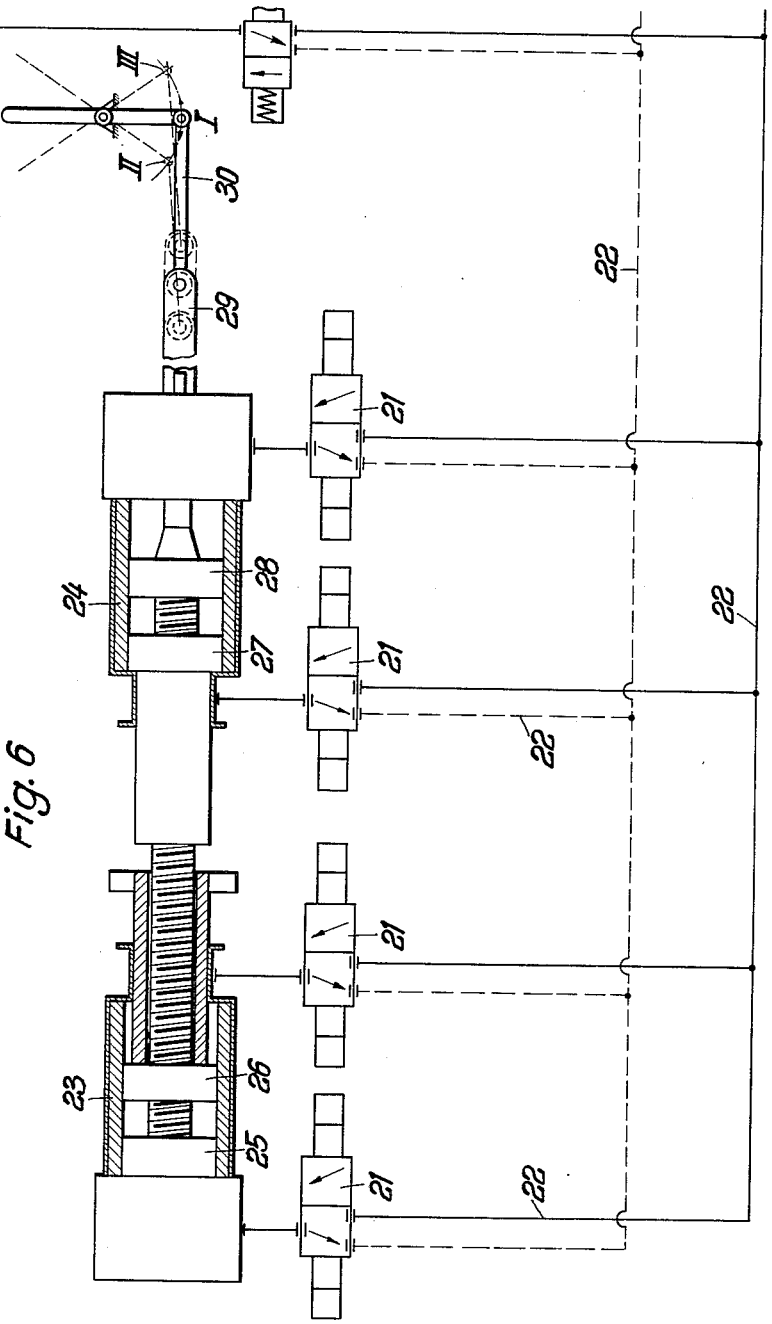

Oct. 19, 1965     T. GÖBEL ETAL     3,212,380
MACHINE FOR PRODUCING SHEET METAL BLANKS AND HAVING
PLURAL ADJUSTABLE FEED STOP ABUTMENTS
Filed April 4, 1963     4 Sheets-Sheet 1
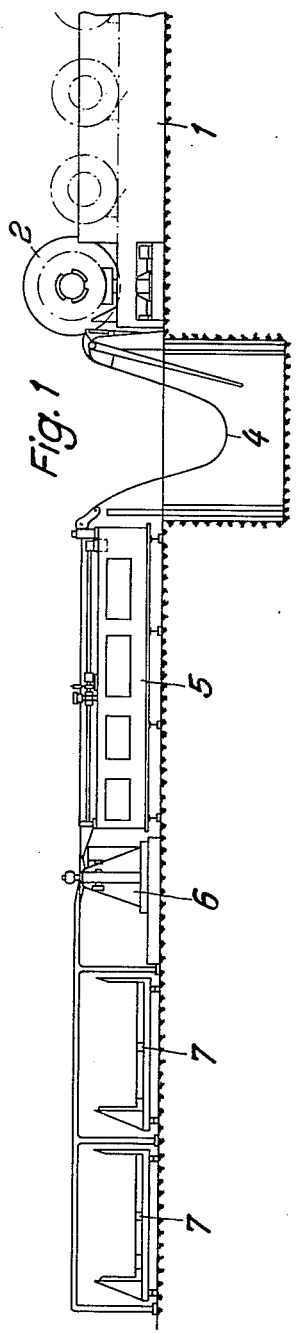
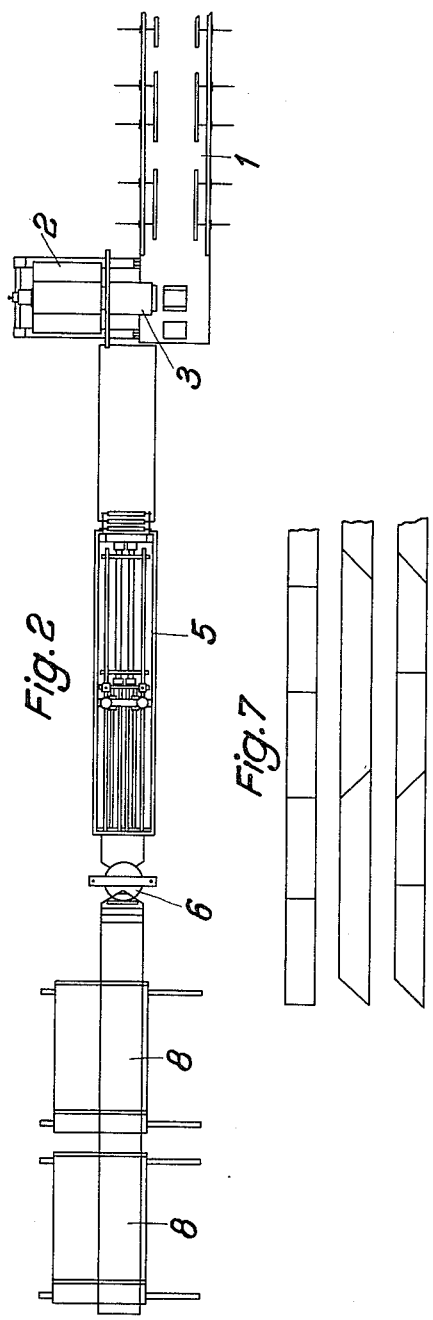
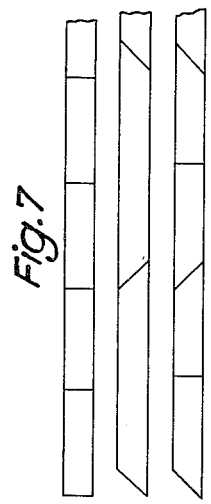
Inventors:
Theodor Göbel &
Karl-Heinz Stöcken
by Singer, Stern & Carlberg
Attorneys

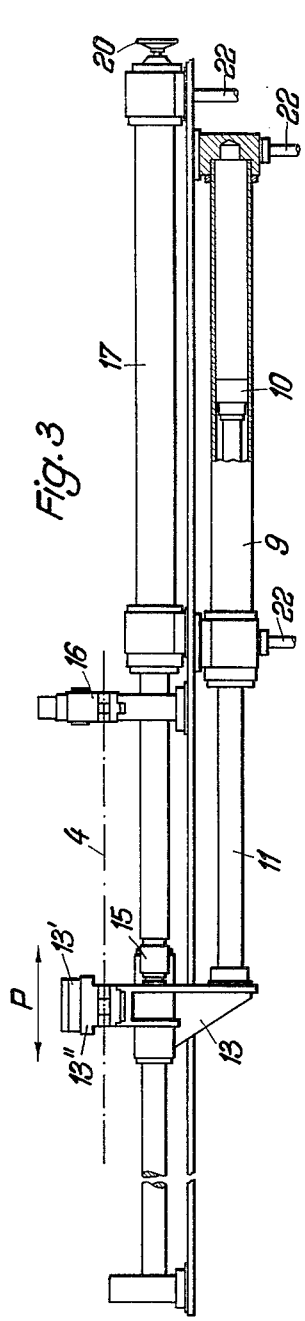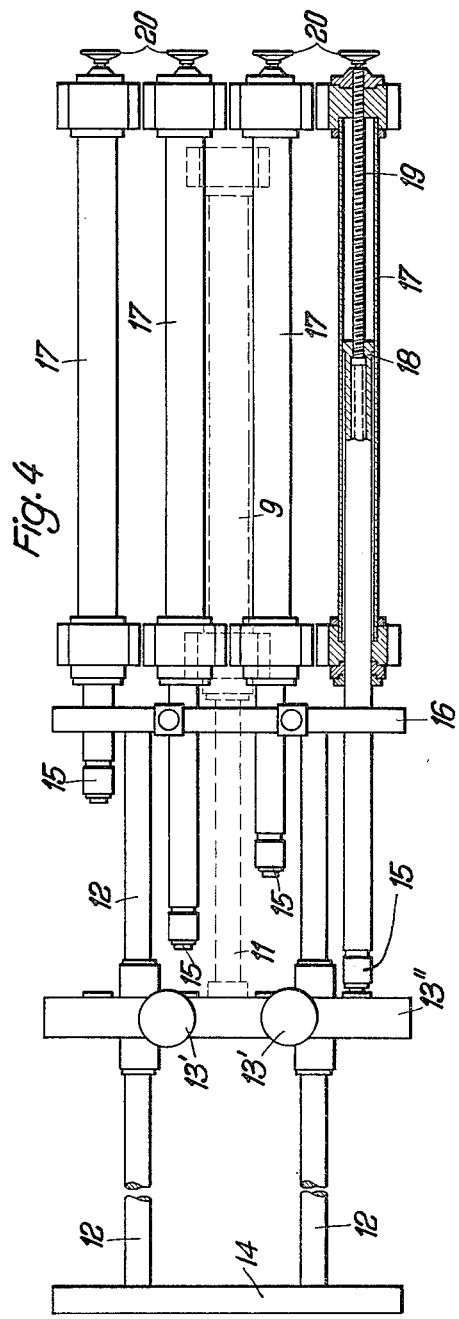

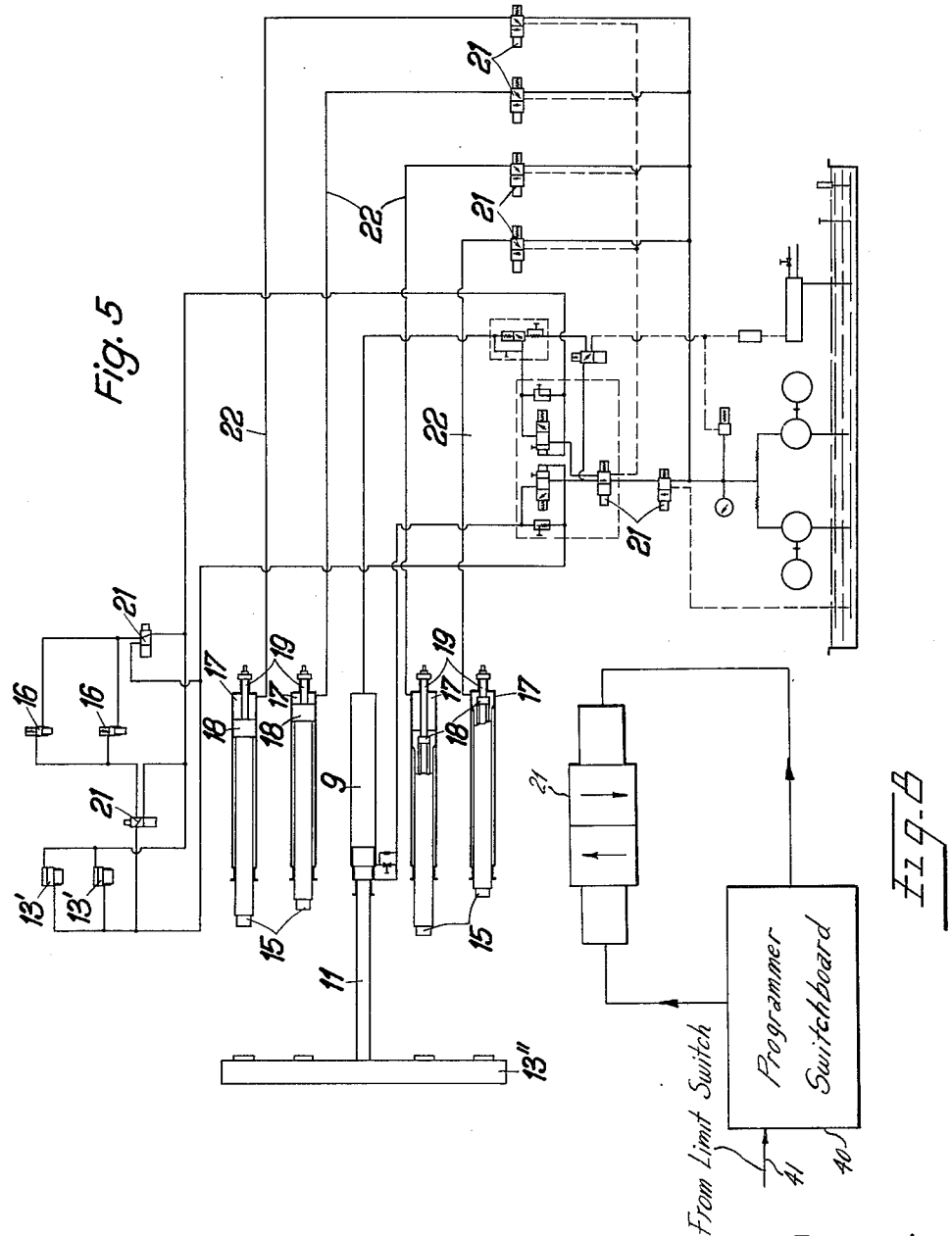

Inventors:
Theodor Göbel &
Karl-Heinz Stöcken
by Singer, Stern & Carlberg
Attorneys United States Patent Office 3,212,380
Patented Oct. 19, 1965

3,212,380
MACHINE FOR PRODUCING SHEET METAL
BLANKS AND HAVING PLURAL ADJUST-
ABLE FEED STOP ABUTMENTS
Theodor Göbel and Karl-Heinz Stöcken, Geesthacht, near
Hamburg, Germany, assignors to Wilhelmsburger Maschinenfabrik Hinrichs & Sohn, Hamburg, Germany
Filed Apr. 4, 1963, Ser. No. 270,725
Claims priority, application Germany, Apr. 10, 1962,
W 32,007
6 Claims. (Cl. 83—247)

The invention relates to a method and a machine for cutting sheet metal blanks of different length and shape from a continuous sheet metal strip. This sheet metal strip is seized by a clamp on a reciprocating feed device and intermittently is pulled by the latter up to a stationary abutment which determines the desired length of the blank to be cut from the continuous strip, whereupon the strip is permitted to come to rest. The desired length of the strip is then cut off whereupon the clamp opens and the feed device returns empty to an adjustable abutment.

In the production of individual sheet metal blanks, for instance dynamo and transformer laminations, heretofore employed machines are not very satisfactory because the laminations to be assembled to a core consist frequently of differently shaped blanks, not only as far as their length is concerned but also the abutting edges are cut off along different angles, and this requires a repeated adjustment of the tools which effect a cross-cutting of the individual blanks from the continuous sheet metal strip. In order to produce economically, for instance, the core structure of transformers, it is advisable to produce one layer of lamination after the other, whereby each layer may consist of up to four different blanks. The thus produced layers of lamination, when discharged in proper succession by the cutting machine and stacked one upon the other, form the desired core.

It is an object of the invention to produce such different sheet metal blanks, also called laminations, in the above mentioned succession one after the other. For this purpose a number of abutments forming the limitations of the different lengths of a similar number of sheet metal blanks is adjusted and fixedly secured in the adjusted positions by a programming device. The latter is also provided with means for adjusting the cross-cut of the sheet metal blanks to inclined angles which deviate from 90°.

The abutments, which preferably are hydraulically adjusted and arrested in the required positions, alternately limit the rearward movement of the feeding device whose clamp is open and empty during this movement, i.e. it performs no work and merely slides along the sheet metal strip. As soon as the clamp engages one of the rearward abutments, however, it closes upon the sheet metal strip so that when now the forward stroke of the feeding device commences, the sheet metal strip is pulled along until the feeding device engages a fixed abutment. The length of this feeding stroke corresponds to the length of the sheet metal blank to be cut from the continuous strip. The programming device takes care of the requirement that alternately one or the other abutment is engaged by the rearwardly moving feeding device.

The programming device also performs the adjustment and arresting of the abutments in accordance with the required lengths of the sheet metal strips. Finally, the programming device controls the cutting device which has the form of a striking shears not only as far as its cutting operation is concerned, but also as far as the angular position of its cut is concerned which is performed on the sheet metal strip.

The pivotal adjustment of the striking shears in the horizontal plane or about a vertical axis, respectively, assures that, for instance, the transformer laminations are cross-cut along a predetermined inclined angle, for instance 45°.

The drawing illustrates diagrammatically one embodiment of the invention.

FIG. 1 is a side elevation view of the machine;
FIG. 2 is a top view of the machine;
FIG. 3 is an enlarged side elevation view of the feeding device, with parts in section;
FIG. 4 is a top view of the feeding device shown in FIG. 3, likewise with parts in section;
FIG. 5 illustrates the hydraulically controlled arrangement of the feeding device and the abutments cooperating with the same;
FIG. 6 illustrates the hydraulic control for the pivotally mounted shears;
FIG. 7 illustrates the successively cut sheet metal blanks produced by the machine of the invention, and
FIG. 8 is a block diagram of a circuit showing a programming switchboard and the connections to one of the control valves.

Referring to the drawings and particularly to the FIGS. 1 and 2 thereof, the machine is provided with a loading ramp 1 which supports the continuous sheet metal strip in form of a spool and delivers it to a cathead 2. A loading chair 3 transports the continuous sheet metal strip onto the cathead 2 for unreeling.

According to FIG. 1 the continuous sheet metal strip 4 is unwound in known manner by forming a downwardly extending loop. The unreeling of the continuous sheet metal strip 4 is controlled by a not illustrated photo-electric device.

A feeding device 5 which in the following will be described in greater detail pulls the sheet metal strip 4 away from the loop in accordance with the desired length of the individual blanks and feeds the sheet metal strip 4 to a cutting device which in the present instance comprises a striking shears 6. The blanks cut from the strip 4 are deposited upon a stacking carriage 7 and a roller bed 8, respectively, which move the completed blanks away from the machine.

According to the FIGS. 3 and 4, the feeding device 5 is provided with a hydraulic cylinder 9 having in its interior an alternately actuated piston 10 so that the latter is moved back and forth. This piston 10 is provided with a piston rod 11, the foremost end of which has fixedly attached thereto a traverse 13 which is slidably supported upon parallel guide rods 12. This traverse 13, when the piston 10 is actuated, is movable in the directions indicated by the double arrow P. The forward limit of this stroke is formed by a fixedly arranged abutment 14 which is mounted on the bed of the feeding device 5. The rearward movement of the traverse 13 is limited by one of a plurality of hydraulically adjustable abutments 15, as will be explained hereinafter.

The traverse 13 is provided with a clamp 13′, 13″ which is so constructed that it grips the sheet metal strip 4 during its outward movement, as shown by a dot and dashed line in FIG. 3. The upper portion 13″ of this clamp is actuated by hydraulic cylinders 13′, and the clamp closes during the outward movement as soon as the feeding movement of the traverse 13 is initiated by a programming device which will be described later.

An additional hydraulically operated clamp 16 which is fixedly mounted on the frame of the machine, is also operatively connected with the just mentioned programming device so that this clamp 16 will be opened when the traverse 13 performs its feeding movement, while on the other hand the clamp 16 is closed when the traverse 13 moves back.

At the start of the operation of the machine, the sheet metal strip is fed through both open clamps 16 and 13 into the range of the striking shears 6. Thereupon the traverse 13 under the action of the piston 10 is moved rearwardly toward the clamp 16, but the clamp 13', 13" thereon is open and does not engage any portion of the sheet metal strip, or in other words, the traverse 13 does not perform any work when it moves rearwardly along the sheet metal strip 4 which is clamped in position by the other clamp 16. The clamp 16 is only then open when the feeding movement of the traverse 13 begins so that the sheet metal strip 4 is pulled by the traverse 13 until the traverse engages the fixed abutment 14.

As explained in the foregoing, the rearward movement of the clamp on the traverse 13 is initiated by the piston 10 and subsequently is brought to a stop when engaging one of the hydraulically adjustable abutments 15 which alternately are controlled by the programming device. For this purpose are provided hydarulic cylinders 17 in which are slidably arranged pistons 18 carrying the abutments 15. Each piston 18 is engaged by a screw spindle 19 the outer ends of which carry hand wheels 20 (FIG. 3) which permit a rotation of the screw spindle 19 and in doing this, the stroke of the abutment 15 within two predetermined limitations is adjusted.

FIG. 5 illustrates a hydraulic diagram of the abutments 15 which are controlled by the programming device. According to this diagram, one piston 18 at a time is actuated by hydraulic fluid which is supplied over magnetic valves 21 and hydraulic lines 22. The respective abutment moves outwardly according to the distance determined by the adjustment of the screw spindle 19 and thereupon is arrested by the hydraulic cushion formed in the cylinder 17. When now the traverse 13 starts to move back, it engages the mentioned abutment 15. This causes a reversing of the hydraulic system, i.e. the traverse 13 begins to move forward and takes the sheet metal strip 4 along, because at the same time the clamp 13 is closed and the clamp 16 is opened. The rearward movement of the traverse 13 does not start again until the traverse has engaged the stationary abutment 14, but in the meantime the hydraulic system has been readjusted by the programming device in such a manner that the hydraulic pressure and the previous abutment is released and another abutment having a different stroke is actuated. In this manner the sheet metal strip according to the different stroke of the traverse 13 is conveyed intermittently.

The cross-cutting operation is performed by the striking shears 6 which is controlled by the programming device. The cutting operation begins when the traverse 13 has engaged the stationary abutment 14 and after the sheet metad strip 4 has come to rest for some time. When the machine of the invention is adjusted for the purpose of producing, for instance, transformer laminations as shown in FIG. 7, not only rectangular cross cuts have to be performed, but certain laminations have to be cross cut at an angle, i.e. so-called miter cuts have to be performed, and therefore the invention provides that the programming device which controls the operation of the striking shears 6 effects an adjustment of the shears during the rest period of the sheet metal strip 4 into selectively three positions by swinging the shears in a horizontal direction or, what is the same, by rotating the shears about a vertical axis.

FIG. 6 illustrates the hydraulic diagram for the pivotally mounted striking shears 6. It will be noted that two hydraulic cylinders 23 and 24 are provided. The hydraulic cylinder 23 has mounted therein two axially spaced pistons 25 and 26, and the hydraulic cylinder 24 has mounted therein the pistons 27 and 28. These pistons in accordance with the hydraulic diagram are controlled by the hydraulic fluid by means of magnetic valves 21 and fluid lines 22 in such a manner that by means of a linkage 29, 30 the shears is adjustable in horizontal direction to assume the positions indicated with I, II and III.

The machine of the invention is not necessarily limited to a hydraulic control, as described. It is also possible to control the various steps actuated by the programming device by pneumatic or mechanical means. Furthermore, it is also possible to employ in place of the hydraulically actuated clamps 13" and 16 any other holding device, such as magnetic clamping means.

FIG. 7 illustrates a series of sheet metal blanks which is produced in accordance with the method of the present invention. It will be noted that these blanks are not only different in length, but that also the cutting angles differ from each other, and all blanks are cut in such a manner that they—put together in proper succession—will form one layer of, for instance, a transformer core.

The programming means is diagrammatically illustrated in FIG. 8 and includes a well known and customarily ararnged switchboard 40 which is provided by way of example with suitable switch plugs actuated in a desired sequence to perform cuts of different lengths for each metal blank shown in FIG. 7. The switchboard 40 is illustrated as being electrically connected to one of the valves 21 to actuate the electromagnetic coils thereof and their usual plungers. While the switchboard is illustrated as being electrically connected to only one of the magnetic valves, it is deemed that a showing of one will suffice for all. The programming syitchboard 40 is electrically controlled by a limit switch mounted on the traverse 13 which engages the abutment 14 and said switch is mounted in a simple series electric circuit for feeding electrical energy to the programming switchboard 40 as at 41. Thus, a predetermined and selected plug in the switchboard has to be actuated for each of the valves 21 of the hydraulic system.

Prior to initiating operation of the machine, the tongs-like traverse is slidably moved manually until it engages the left hand abutment 14 shown in FIG. 3. When the traverse 13 engages this abutment, a limit switch (not shown) on the front face of the traverse is actuated and hence, the first plug on the switchboard controlling a selected magnetic valve 21 effects the proper adjustment of the first movable abutment 15.

The machine is now started and the traverse 13 returns to its initial position, the clamping means close on the workpiece and moves the same forward due to the reversal of the hydraulic means and then takes the sheet metal strip 4 forward which is gripped by the closed clamping means.

The forward moving traverse 13 again engages the left hand abutment 14 and the limit switch (not shown) carried thereby is again actuated and the second switch on the switchboard is controlled to cause the next succeeding abutment 15 to move into its preselected position.

The traverse 13 during its next rearward travel engages the last mentioned abutment 15, and the same operation described is repeated so that the blanks will be successively cut as shown in FIG. 7 in a completely automatic manner.

When a preselected plug is used for cutting a blank to a predetermined length, the desired angular cut is simultaneously selected.

What we claim is:

1. In a machine for producing sheet metal blanks of different length from a continuous sheet metal strip, a reciprocating feed device provided with a clamp thereon for seizing and holding said sheet metal strip and pulling it in one direction, a stationary abutment against which said feed device is moved when moving in strip pulling direction, a cutting device for removing a sheet metal blank from said sheet metal strip after the latter has come to rest against said stationary abutment, a plurality of adjustable abutments against anyone of which said feed device is adapted to engage when it returns alone to a rearward position for again gripping and holding said sheet metal strip for another feeding movement, stationary clamping means for holding said sheet metal strip against movement when said feeding means returns to a rearward position, means for opening said clamp means for releasing said sheet metal strip when the feeding device moves again forwardly, and means for adjusting said adjustable abutments in accordance with the different lengths of the blanks to be cut from said sheet metal strip.

2. A machine according to claim 1, including hydraulically actuated pistons in hydraulic cylinders for carrying said adjustable abutments, and screw spindles operatively connected with said pistons for adjusting the positions of the same in said cylinders.

3. A machine according to claim 1, including hydraulically actuated pistons in hydraulic cylinders for carrying said adjustable abutments, screw spindles operatively connected with said pistons for adjusting the positions of the same in said cylinders, and a programming device for controlling the admission of fluid into said hydraulic cylinders and alternately against said pistons so that only the piston in operative position is actuated.

4. In a machine for producing sheet metal blanks of different length from a continuous sheet metal strip, a reciprocating feed device provided with a clamp thereon for seizing and holding said sheet metal strip and pulling it in one direction, a stationary abutment against which said feed device is moved when moving in strip pulling direction, a cutting device for removing a sheet metal blank from said sheet metal strip after the latter has come to rest against said stationary abutment, a plurality of adjustable abutments against anyone of which said feed device is adapted to engage when it returns alone to a rearward position for again gripping and holding said sheet metal strip for another feeding movement, stationary clamping means for holding said sheet metal strip against movement when said feed device returns alone to said rearward position, means for opening said clamping means for releasing said sheet metal strip when said feed device moves again forwardly, means for adjusting said adjustable abutments in accordance with the different lengths of the blanks to be cut from said sheet metal strip, means for rotatably adjusting said cutting device for performing different angular cross-cuts on said sheet metal strip, and a programming device for controlling the adjustment of said adjustable abutments and said cutting device.

5. In a machine for producing sheet metal blanks of different length from a continuous sheet metal strip, a reciprocating feed device provided with a clamp thereon for seizing and holding said sheet metal strip and pulling it in one direction, a stationary abutment against which said feed device is moved when moving in strip pulling directions a cutting device for removing a sheet metal blank from said sheet metal strip after the latter has come to rest against said stationary abutment, a plurality of adjustable abutments against anyone of which said feed device is adapted to engage when it returns alone to a rearward position for again gripping and holding said sheet metal strip for another feeding movement, stationary clamping means for holding said sheet metal strip against movement when said feed device returns alone to said rearward position, means for opening said clamping means for releasing said sheet metal strip when said feed device moves again forwardly, means for adjusting said adjustable abutments in accordance with the different lengths of the blanks to be cut from said sheet metal strip, means for rotatably adjusting said cutting device for performing different angular cross-cuts on said sheet metal strip, and a programming device for hydraulically controlling the adjustment of said adjustable abutments and said cutting device.

6. In a machine for producing sheet metal blanks of different length from a continuous sheet metal strip, a reciprocating feed device provided with a clamp thereon for seizing and holding said sheet metal strip and pulling it in one direction, a stationary abutment against which said feed device is moved when moving in strip pulling direction, a cutting device for removing a sheet metal blank from said sheet metal strip after the latter has come to rest against said stationary abutment, a plurality of adjustable abutments against any one of which said feed device is adapted to engage when it returns alone to a rearward position for again gripping and holding said sheet metal strip for another feeding movement, stationary clamping means for holding said sheet metal strip against movement when said feed device returns alone to said rearward position, means for opening said clamping means for releasing said sheet metal strip when said feed device moves again forwardly, means for adjusting said adjustable abutments in accordance with the different lengths of the blanks to be cut from said sheet metal strip, means for rotatably adjusting said cutting device for performing different angular cross-cuts on said sheet metal strip, and a programming device for hydraulically controlling the adjustment of said adjustable abutments and said cutting device, said programming device including a linkage connected with pistons in hydraulic cylinders and with said adjustable cutting device, which cross-cutting direction is adjustable by said pistons and linkage to a rectangular cut and to two additionl angular cuts to both sides of said rectangular cut.

References Cited by the Examiner
UNITED STATES PATENTS

| | | | |
|---|---|---|---|
| 2,379,002 | 6/45 | Haller | 83—277 |
| 2,428,493 | 10/47 | Haller | 83—277 |
| 2,511,450 | 6/50 | Abbey | 226—141 |
| 2,749,981 | 6/56 | MacKinnon et al. | 83—277 |
| 2,832,591 | 4/58 | Fillingame | 226—141 |

FOREIGN PATENTS 1,220,265  1/60  France.

WILLIAM W. DYER, Jr., *Primary Examiner.*

ANDREW R. JUHASZ, *Examiner.*